United States Patent [19]

Harms

[11] Patent Number: 5,278,203
[45] Date of Patent: Jan. 11, 1994

[54] METHOD OF PREPARING AND IMPROVED LIQUID GELLING AGENT CONCENTRATE AND SUSPENDABLE GELLING AGENT

[75] Inventor: Weldon M. Harms, Duncan, Okla.

[73] Assignee: Halliburton Company, Duncan, Okla.

[21] Appl. No.: 972,053

[22] Filed: Nov. 5, 1992

Related U.S. Application Data

[63] Continuation of Ser. No. 673,035, Mar. 21, 1991, abandoned.

[51] Int. Cl.$^5$ .................. C08K 9/04; C08L 1/26; C08L 33/08; C09K 7/00
[52] U.S. Cl. .................. 523/200; 106/169; 106/178; 106/205; 523/205; 524/35; 524/44; 524/45; 524/55; 536/52; 536/91; 536/96
[58] Field of Search .................. 523/200, 205; 524/35, 524/44, 55, 45; 106/169, 178, 205; 536/52, 91, 96

[56] References Cited

U.S. PATENT DOCUMENTS

| | | | |
|---|---|---|---|
| 3,242,120 | 3/1966 | Steuber | 525/57 |
| 4,542,171 | 9/1985 | Elser et al. | 523/201 |
| 4,737,533 | 4/1988 | Charmot et al. | 524/503 |
| 4,771,086 | 9/1988 | Martin | 523/200 |
| 5,091,448 | 2/1992 | Hostettler et al. | 524/503 |
| 5,171,764 | 12/1992 | Katayawa et al. | 523/201 |

Primary Examiner—Paul R. Michl
Assistant Examiner—Andrew E. Merriam
Attorney, Agent, or Firm—Robert A. Kent; Brad Ganz

[57] ABSTRACT

Water-soluble, polymer viscosifiers of aqueous solutions, also known as gelling agents, can be suspended in a hydrocarbon carrier fluid, such as, diesel to prepare a liquid gel concentrate. When a liquid gel concentrate is added to an aqueous solution the gelling agent disperses into it and viscosifies it. To make an improved performance admixture for preparation of liquid gel concentrates and render the gelling agent suspendable in the hydrocarbon carrier fluid, it is first coated with a mixture of an oil-compatible polymer suspending agent, such as a polymer suspension, comprising a branched chain alkyl acrylate monomer copolymerized with a minor amount of hydrophilic monomer such as acrylic acid with an appropriate amount of internal crosslinking agent to control polymer particle size, and a surfactant such as a nonylphenol reacted with several moles of ethylene oxide, styrenated phenol ethoxylate, or a phosphate ester of styrenated phenol ethoxylate. The treated viscosifier may be dried, if desired, and packaged. The admixture subsequently may be admixed with a hydrocarbon carrier fluid, making a time stable liquid gel concentrate that was easily prepared. The liquid gel concentrate can then be used to viscosify aqueous solutions for such uses as frac fluids or drilling muds.

17 Claims, No Drawings

METHOD OF PREPARING AND IMPROVED LIQUID GELLING AGENT CONCENTRATE AND SUSPENDABLE GELLING AGENT

This application is a continuation of application Ser. No. 673,035, filed Mar. 21, 1991, now abandoned.

BACKGROUND OF THE INVENTION

1. Field of the Invention

This invention relates to gelling agents and to methods of preparing concentrated slurries of polymeric viscosifiers for use in the oil and gas drilling industry. More particularly, the invention relates to a method of treating natural and synthetic water soluble polymer solids with suspending agents so that the polymers can be suspended in a hydrocarbon carrier fluid.

2. Description of the Related Art

Natural and synthetic polymer solids are useful as viscosifiers of aqueous solutions. Viscosified aqueous solutions are used in the oil and gas drilling industry, particularly as frac fluids and as drilling muds.

Frac fluid is pumped into a well to induce or expand cracks in the earthen formation. Causing formation fractures generally will stimulate well production. Water has been used as a frac fluid because it is inexpensive. However, alone, water is not particularly effective at creating sufficient crack width. A more viscous fluid is needed.

Viscosified fluids are also useful as drilling muds. Drilling muds are viscous fluids that maintain pressure against bore holes during drilling and prevent bore holes from caving in. Due to the hydrostatic pressure they impart they also prevent wells from producing excess natural fluids.

Drilling muds and frac fluids are viscosified by adding a viscosifier to an aqueous solution. Consequently, substances have been developed that viscosify water. Common viscosifiers are natural and synthetic water-soluble polymers. These viscosifiers are also referred to as gelling agents. Generally, a gelling agent is a high molecular weight, water-soluble or dispersible polymer. The term is intended to mean polymers which form colloidal solutions or dispersions in water.

Ideally, in an aqueous solution, each gelling agent particle should be separated and wetted. Gelling agents, however, are very difficult to disperse in aqueous liquids. For example, in conventional processes for dissolving gelling agents, dry powdered polymer is fed slowly and carefully into the vortex of a vigorously stirred aqueous solution. Directly adding dry polymer into the aqueous solution often results in undesirable agglomerations of polymer, which are called "fish eyes". Fish eyes are polymer masses wetted on the outside, but with dry, unhydrated material inside.

In the field, addition of a gelling agent to a solution is particularly tedious and problemsome. Often, for example, personnel simply dump the powder into the aqueous solution, start the mixing equipment, and expect the material to disperse or dissolve. Under these circumstances, excessive numbers of fish eyes often result. Mechanical feeders and eductors can lead to better polymer separation and wetting. However, such machinery is inefficient and frequently fails to prevent formation of fish eyes, particularly when used with warm or hot water.

Because of the problems related to mixing and dispersing gelling agent, improved methods have been developed. Sometimes the dry powdered polymer is treated with a surface active material that enhances the penetration of liquid into the gelling agent so that particles separate. Water-soluble inert salts, such as sodium chloride or effervescing salts, may also be used to separate and reduce the agglomeration of gelling agent particles. Certain gelling agents, such as the various cellulose ethers, xanthan gum, and guar gum, have been treated with temporary, removable crosslinking agents to decrease the gelling agent's hydration rate in aqueous solutions. Cross-linking allows gelling agents to disperse into solution before they hydrate.

Many problems associated with suspending gelling agents in an aqueous liquid have been overcome by adding the gelling agent to an aqueous solution as a liquid gel concentrate (hereinafter "LGC") instead of as a solid powder. An LGC, as defined here, is a concentrate of gelling agent suspended in a hydrocarbon carrier fluid. LGCs typically contain: (1) a gelling agent; (2) a hydrocarbon carrier fluid such as a diesel fuel, mineral or vegetable oil; and (3) suspending agents. They sometimes also include a surfactant for enhancing the release of the polymer into an aqueous solution. When the LGC is added to an aqueous solution, the gelling agent is released from the carrier fluid, and disperses into the aqueous solution efficiently and effectively. LGCs are described in Harms et al, U.S. Pat. No. 4,772,646 (hereinafter the "Harms '646 patent").

Important advantages of using LGCs include savings of equipment, materials, and manpower. These advantages are described in Harms et al, *Diesel-Based HPG Concentrate Is Product of Evolution*, Petroleum Engineer International pp. 51–54 (April 1988). By themselves, water-soluble gelling agents are not particularly active in a hydrocarbon carrier fluid. Without suspending agents any suspension of the gelling agent is temporary--the solid gelling agent in hydrocarbon liquid ultimately drops through the liquid, leaving a layer of carrier fluid and a layer of sludged solids.

Thus a suspending agent is an important component of an LGC. In the conventional method of preparing an LGC, the suspending agent is admixed with the hydrocarbon fluid separately from the admixing of the gelling agent with the hydrocarbon fluid.

A good suspending agent generally does at least two things. First, it increases, at least to a limited degree, the hydrocarbon's viscosity. However, increased viscosity alone is not enough to suspend solids. So, second, suspending agents also cause the gelling agents to resist agglomeration. The mechanism by which this occurs is poorly understood. It is possible that the suspending agents increase mutual repulsion between polymer solid particles by altering electronic charges on the solid surfaces. It may also be that the suspending agents form films around the individual solid particles that prevent the solids from contacting each other. Regardless of the mechanism involved effective suspending agents cause solids to become more uniformly dispersed in the carrier fluid.

Typical suspending agents include (1) organophilic clays, such as Bentones ® and Claytones ®; (2) hydrophobic silicas, such as Cab-O-Sil ®, and fumed silica; and (3) oil-compatible polymer suspending agents, such as is described in Dymond, U.S. Pat. No. 4,670,501 (hereinafter the "Dymond '501 patent"). Combinations of these three kinds of suspending agents can also effectively suspend gelling agents in hydrocarbon.

Of particular interest to the present invention are the suspending agents described in the Harms '646 patent, which are used to prepare LGCs. See also the Dymond '501 patent, which describes preparing oil compatible suspending agents. A commercial suspending agent featured in the '501 patent is GS-5 available from Halliburton Services, Duncan, Okla. Generically, GS-5 is a copolymer comprising primarily a branched chain alkylacrylate and acrylic acid.

Unless indicated otherwise, the term "suspending agent," as used herein, means oil-compatible suspending agents, such as those described in the Harms '646 and Dymond '501 patents.

Until the present invention, certain drawbacks were associated with the use of oil-compatible polymer suspending agents. For example, commercially available compounds generally are prepared via aqueous emulsion polymerization; the emulsion generally has a high water content. The water can react undesirably with gelling agents, causing them to lump, sludge, or alter viscosity performance.

Similarly, the LGC can become contaminated with water in storage by humidity or condensed moisture. Unstable LGCs often result. Bleed-out can occur in a matter of hours to several days after preparation. Other problems also exist. For example, in the conventional field method of preparing an LGC from a gelling agent such as hydroxypropylguar (hereinafter "HPG") and the suspending agent GS-5, the GS-5 is injected into a centrifugal pump to rapidly divide and disperse the GS-5 emulsion material over the hydroxypropylguar solids flowing in diesel. If GS-5 is added without rapid dispersion, an inferior concentrate with agglomerated polymer particles results. In the field, this occurs when personnel pour GS-5 into an open hatch rather than inject it into a centrifugal pump.

Other problems pertain to field preparation of LGCs. Because an LGC is multi-componented, numerous opportunities exist for improper preparation of the LGC—mismeasurement of any component can yield an ineffective LGC. For field use, it is therefore desirable to have all the solid components of the LGC as a single powder, or "one-bag," mixture that can be added directly to the carrier fluid. It is also desirable for the LGC to be storage stable and to require a minimum amount of suspending agent.

SUMMARY OF THE INVENTION

The present invention is an improved method for dispersing gelling agent in a hydrocarbon carrier fluid to create a liquid gel concentrate, which then can be used to viscosify an aqueous solution for use in subterranean formations. This invention overcomes one or more drawbacks in the prior art and provides an LGC that is user friendly, in terms of preparation and use, and that is time and storage stable. No elaborate admixing of the one-bag source with the carrier fluid is required. Thus, savings in time and effort can be significant when compared to individually admixing the ingredients of an LGC. Similarly, the one-bag system of ingredients also minimizes the possibility that an inefficacious LGC will result due to mismeasurement of an ingredient. The invention also uses less suspending agent than conventional techniques. It produces a flowable mixture, which minimizes the problem of equipment gum-up. Thus, it also minimizes the need for flowability additives. Further, the invention is likely to dramatically improve the compatibility of different concentrates when mixed in common equipment, pumps, and lines. As used in this patent, the term "suspendable gelling agent" is defined to mean one that has one or more of the aforementioned properties.

The present invention provides a gelling agent with a sufficient coating of a suspending agent to improve the suspendability of the gelling agent in a hydrocarbon carrier fluid relative to uncoated gelling agent. The preferred gelling agents include guar gum, hydroxypropylguar, carboxymethyl-hydroxypropylguar, hydroxyethylcellulose, and carboxymethyl-hydroxyethylcellulose. The preferred suspending agent for use in the various embodiments of this invention is an aqueous colloidal suspension or emulsion of a copolymer comprising a substantially water-insoluble polymer of particles having a dry-weight average size below 10 $\mu$m and which is formed from monomers of which from about 80% to about 100% are hydrophobic, from about 30% to about 100% are polar, and from about 0% to about 20% are hydrophilic. Compounds of the foregoing type are disclosed in U.S. Pat. Nos. 4,772,646 and 4,670,501, the entire disclosures of which are incorporated herein by reference for all purposes. GS-5 is such a suspending agent. The percentage ratio (w/w) of suspending agent to gelling agent can range from about 0.1% to about 50% with a preferred range being from about 0.5% to about 20%. The currently most preferred range is from about 4% to about 15%. It is most advantageous if the composition also includes a surfactant to further enhance the gelling agent's suspendability in a hydrocarbon carrier fluid. The surfactant and suspending agent should be applied together in the same mixture to coat the gelling agent. Preferred surfactants are nonylphenol ethoxylates or styrenated phenol ethoxylates. It is, however, believed that various other surfactants commonly known by those of ordinary skill in the art will also work such as butylpropasol, alkylimidazolines, propylene glycol, diamines treated with ethylene and propylene oxides. The ratio (v/v) of surfactant to suspending agent coating is from about 1:5 to about 5:1, with a 1:1 ratio being preferred.

The suspendable gelling agent can be prepared by, first, treating a gelling agent with an amount of suspending agent sufficient to coat the gelling agent and suspend it in a hydrocarbon carrier fluid; and, second, substantially or entirely drying the treated gelling agent. This second drying step is preferable, but is not believed to be mandatory. It is most advantageous to cotreat the gelling agent with a surfactant, coating the gelling agent as uniformly as possible with both the suspending agent and the surfactant. Failure to cotreat the gelling agent with a surfactant can result in a time unstable LGC. For coating the gelling agent, the percentage ratio (w/w) of suspending agent to gelling agent can range from about 0.1% to about 50% with a preferred range being from about 0.5% to about 20%. The currently most preferred range is from about 4% to about 10%. The presence of an effective surfactant can lower the required amount of suspending agent, although the total weight of suspending agent and surfactant will usually be greater than suspending agent alone. The surfactant/ suspending agent ratio (v/v) should be from about 1:5 to about 5:1. A ratio of about 1:1 surfactant/suspending agent is preferred for treating the gelling agent. Spraying is the preferred method of coating the gelling agent with a suspending agent or a suspending agent/surfactant mixture. The suspending agent and surfactant can also be admixed in a compatible diluent prior to co-treatment of the gelling agent. An example diluent is 2-ethylhexanol. The diluent helps to thin the mixture, making it easier to use. The treated gelling agent is preferably allowed to dry, after which time it can be admixed with a carrier fluid to form an LGC. The dried material can be packaged or placed in appropriate bulk storage containers.

If desired, other substances can be premixed with the treated gelling agent such as flow additives, crosslinking agents, antioxidants, bactericidal agents, clay stabilizing agents, Ph buffers, clay dispersions, dispersants, emulsifiers, and the like either before or after the treated gelling agent has dried, depending upon the nature of the substance.

Once prepared, the treated and dried gelling agent can be admixed at any time with a hydrocarbon carrier fluid to form an LGC. The LGC is capable of supporting up to about 0.6 kilograms of gelling agent per liter of concentrate. The LGC can then be admixed with an aqueous solution where it will release the gelling agent into the aqueous solution and produce a viscosified fluid. The viscosified fluid is intended for use as a frac fluid or drilling mud.

DETAILED DESCRIPTION OF A PREFERRED EMBODIMENT

This invention is expected to suspend a wide variety of natural, modified natural, and synthetic polymer gelling agents. Those described herein are merely examples and not an exhaustive list of the many polymers that are within this invention's scope. The gelling agents useful in this invention include a water dispersible or soluble hydrophilic colloid such as cellulose derivatives, starch derivatives, gum ghatti, gum arabic, gum tragacanth, locust bean gum, gum karaya, guar gum, carrageenan, algin, biopolymers and mixtures thereof.

These polymers may be used unmodified, as normally isolated from their source materials, or they may be modified by hydroxyalkylation, carboxyalkylation, or mixed hydroxyalkylation carboxyalkylation to form ether derivatives, such as hydroxyethyl ethers, hydroxypropyl ethers, carboxymethyl ethers, mixed hydroxyethylcarboxymethyl ethers and the like, as is well known in the polymer art. Many of these derivatives form clear solutions in water. Thus, the term "water-soluble polymer" is intended to mean polymers which form colloidal solutions or colloidal dispersions in water.

Gelling agents include gum ghatti, gum arabic, gum tragacanth, locust bean gum, gum karaya, guar gum, carrageenan, algin, biopolymers, hydroxyethylcellulose, hydroxyethyl ghatti gum, hydroxyethyl arabic gum, hydroxyethyl tragacanth gum, hydroxyethyl locust bean gum, hydroxyethyl karaya gum, hydroxyethyl guar gum, hydroxyethyl carrageenan, hydroxyethyl alginate, hydroxyethyl xanthan gum, carboxymethyl cellulose carboxymethyl ghatti gum, carboxymethyl arabic gum, carboxymethyl tragacanth gum, carboxymethyl locust bean gum, carboxymethyl karaya gum, carboxymethyl guar gum, carboxymethyl carrageenan, carboxymethyl alginates, carboxymethyl xanthan gum, carboxymethylhydroxymethyl cellulose carboxymethylhydroxyethyl ghatti gum, carboxymethylhydroxyethyl ghatti gum, carboxymethylhydroxyethyl arabic gum, carboxymethylhydroxyethyl tragacanth gum, carboxymethylhydroxyethyl locust bean gum, carboxymethylhydroxyethyl karaya gum, carboxymethylhydroxyethyl guar gum, carboxymethylhydroxyethyl carrageenan carboxymethylhydroxyethyl algi-nates, carboxymethylhydroxyethyl xanthan gum, carboxymethylhydroxyethyl cellulose, hydroxypropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, alkyl hydroxypropyl cellulose, carboxymethyl starch, hydroxyethylstarch, carboxymethylhydroxyethyl starch and mixtures thereof.

The most preferred polymers for use in the present invention are guar gum, hydroxypropylguar (HPG), carboxymethyl-hydroxypropylguar (CMHPG), hydroxyethylcellulose (HEC) and carboxymethylhydroxyethylcellulose (CMHEC).

Although the gelling agent is typically a natural polysaccharide polymer, synthetic polymers can also be used. Synthetic gelling agents are used less often mainly because of their relatively high cost, rather than for their performance. Synthetic gelling agents include polyacrylamide and copolymers of acrylamide with another monomer. Other synthetic polymer gelling agents include polyvinylalcohol, polyvinylpyrollidone, polyvinylacetate, and polymethacrylates.

The gelling agents can be treated with a variety of suspending agents and surfactants. See, e.g., the '646 and '501 patents. The term "suspending agent" especially includes an aqueous colloidal suspension or emulsion of a copolymer comprising a water-insoluble polymer of particles having a dry-weight average size below 10 micrometers and which is formed from monomers of which 80 to 100% are hydrophobic, 30–100% are polar, and 0–20% are hydrophilic. A preferred suspending agent is GS-5. Commercially, spraying GS-5 onto polysaccharide solids during manufacturing and processing of gelling agent allows the gelling agent to effectively dry the water from the GS-5 suspension. Dehydration is believed to contribute to breaking the GS-5 emulsion and to reducing agglomeration.

It is most preferable, however, to cotreat the gelling agent with a surfactant if a time stable suspension is desired. Absent the surfactant, the gelling agent may bleed-out of the hydrocarbon carrier. For example, HPG sprayed with 5–10% GS-5 alone prepares a concentrate that has a time stability of less than seventy-two hours. After this time, significant diesel bleed-out occurs, and the HPG solids coalesce into a sludgy, somewhat rubbery mass that resists resuspension. However, 12–14% GS-5 alone provides a better result. Better yet, from about 5% to 13% of a 1:1 mixture of surfactant and suspending agent sprayed on the gelling agent extends the stability of the LGC beyond seventy-two hours.

GS-5 is available as a water external colloidal suspension. This suspension can be directly mixed with the appropriate surfactant. It is believed that the significance of the surfactant is that it breaks, or yields, the suspension to liberate the internally held polymeric suspending agent to form a liquid. A yielded suspension is one preferred way of applying suspending agent to the powdered gelling agent. Therefore, enough surfactant should be present to yield the suspending agent's colloidal suspension. Although contact with the gelling agent itself has a propensity to break the suspension by drawing water from it, the breaking of the suspension occurs less effectively without surfactant cotreatment. Example surfactants are nonylphenols ethoxylated with 4 to 14 moles E.O., an admixture of nonylphenol ethoxylated with 4 moles E.O. & the condensation product of nonylphenol with formaldehyde, ethylene glycol monobutylether, and a nonylphenol $(E.O.)_{10}(P.O.)_{10}$ block copolymer.

Useful suspending agent/surfactant mixtures have ratios (v/v) ranging from about 1:5 to about 5:1. Too little surfactant in the mixture results in a sticky and unmanageable mixture; too much surfactant can result in excess water and excess surfactant in the mixture. If commercial spraying equipment is to be used, the suspending agent/surfactant ratio should not be so high that the mixture will not easily flow through the equipment. The preferred suspending agent/surfactant ratio is about 1:1. It is believed that a compatible diluent may be helpful to thin the mixture to improve its flow an spraying properties as well as to expedite the clean-up process after spraying has been completed. An example of such a diluent is 2-ethylhexanol. It is usually added in an amount of from about 0.1 to about 5 (v/v) parts to the mixture. Other diluents include THF, dioxane, methylenechloride and N-methyl pyrollidone.

The 1:1 suspending agent/surfactant mixture, or other chosen ratio of suspending agent/surfactant, should be sprayed onto the gelling agent so that the particles of gelling agent are coated with the mixture. Generally, the desired volume of the suspending agent/surfactant mixture is sprayed onto the gelling agent as the gelling agent is mixed in a standard commercial mixing vessel or other suitable equipment.

Although spraying is the preferred way to treat the gelling agent, other methods of treating the gelling agent are contemplated. Any method of imparting the gelling agent with a coating of the suspending agent/surfactant mixture, serves the same purpose as spraying. For example the gelling agent might be spread thinly over trays, soaked in suspending agent/surfactant mixture, and then heat dried.

Generally, it is believed that useful percent ratios (w/w) of suspending agent (particularly GS-5) to gelling agent (particularly guar derivatives) are from about 0.1% to about 50%. In terms of a 1:1 suspending agent/surfactant mixture, about 10% to about 25% of the 1:1 (about 5% to about 13% suspending agent) is effective for guar. About 8% to about 15% of 1:1 (about 4% to about 8% suspending agent) is effective for HPG. For guar, a preferred ratio is about 17% of 1:1 (about 8% suspending agent). For HPG, a preferred ratio is about 11% of 1:1 suspending agent/surfactant (about 5.5% suspending agent).

If surfactant is not mixed with the suspending agent, a significantly higher percentage (10% or more) of suspending agent is required to obtain the same result. Thus the present invention uses significantly less suspending agent than conventional techniques. It should be noted that if the percentage (w/w) of suspending agent exceeds about 30%, it may result in a poor handling LGC. While it is believed that effective LGCs can be prepared from the above-described ratios and percentages, optimum combinations could easily be found by testing with scaled down samples, with minimum effort by persons of ordinary skill in the art.

The treated gelling agent is preferably allowed to substantially or completely dry prior to addition to the carrier fluid. Drying may be accomplished by passing warm air through the blend. Preferably, the treated gelling agent's moisture content should not exceed about 1%. Drying the admixture of suspending agent and gelling agent reduces the water content from the suspending agent suspension and alleviates some of the problems that water causes. The treated gelling agent may be heat dried, but temperatures over 120°-150° C. might scorch the gelling agent or other materials.

In some instances drying may not be necessary as a result of the addition of other substances that absorb moisture. For example, free flow agents may be added to the treated gelling agent to offset the effects of any excess water in the sprayed gelling agent. Free flow agents include sodium silicates, talc, clays, desiccants, and silicas.

The one bag mixture or the LGCs of the present invention may also contain other materials to impart special properties to the mixtures, LGCs, or to the aqueous liquids in which the LGCs are used. It is expected that these other materials can be added with the treated gelling agent to the LGC as part of the one bag source of material. Thus, the one bag source may contain antioxidants, bactericidal agents, clay stabilizing agents, organophilic clay suspending agents, flow agents such as Cab-O-Sil®, Ph buffers, clay dispersions, dispersants, emulsifiers, and the like. Especially advantageous is the incorporation of a compatible crosslinking agent for the gelling agent, which can be added to the LGC. An appropriate crosslinking agent has no significant effect upon the hydratable polymer in the LGC until addition to an aqueous liquid.

The hydrocarbon carrier fluids useful in the present invention may be any of which have no substantial swelling effect on the gelling agent used in the invention. Preferably, for safety reasons, the hydrocarbon comprises a distilled petroleum fraction having a low viscosity and high flash point. Suitable hydrocarbons include mineral oils, diesel fuel, kerosene, various other petroleum fractions and the like. Low toxicity drilling fluid oils made from hydrogenated fractionated petroleum may also be used. A variety of natural oils are also contemplated as carrier fluids. These include soybean oil, corn oil, sunflower oil, safflower oil, peanut oil, rape seed oil. The most preferred hydrocarbon is diesel.

The LGCs of the present invention can be used to produce a viscosified aqueous liquid by admixing a quantity of the LGC with an aqueous liquid. The LGC can contain from about 2% to about 60% by weight of gelling agent and remain a uniform dispersion. Particularly desirable are LGCs containing from about 25% to about 50% by weight gelling agent. High shear mixing is recommended. Upon addition to an aqueous solution, the gelling agent readily disperses and rapidly hydrates to viscosify the solution. This occurs without the formation of fish eyes or other undesirable agglomerates. The crosslinking agent, if present, after activation, crosslinks the gelling agent upon dissolution in the aqueous liquid.

The aqueous solutions that can be viscosified are well known to those of ordinary skill in the art and include: (1) water, and water and an electrolyte. An aqueous solution can be viscosified by admixing it with an LGC volume containing a desired amount of gelling agent.

To further illustrate the present invention, the following example is provided.

EXAMPLE 1

To illustrate the beneficial effects of the present invention, a series of LGC samples were prepared for comparison. A control sample was prepared by dispersing guar, a surfactant comprising nonylphenol ethoxylated with 10 moles E.O. and an organophilic clay suspending agent in 23.2 ml of diesel. A second sample was prepared in a similar manner dispersing HPG, without a surfactant, in diesel which had been treated with 10.2% (w/w based on HPG) GS-5. The constituents were added to the diesel in the conventional manner without the gelling agent having been coated with suspending agent or surfactant prior to addition to the diesel.

Four samples then were prepared in which the gelling agent was coated by spraying with suspending agent and in some instances surfactant before addition to the diesel. The third sample was prepared by spraying 7% (w/w based on guar) GS-5 on a quantity of guar which then was dried at ambient temperature for about 24 hours. The sample was prepared by mixing 18.3 grams of the treated guar with 23.2 ml of diesel. A fourth sample was prepared like the third except that HPG was substituted for the guar. No surfactant was sprayed on the gelling agent in samples three or four. A fifth sample was prepared by spraying 3 ml of a 1:1 GS-5/surfactant mixture on 18.3 grams of guar. After drying for 24 hours at ambient temperature, the sample was admixed with 23.2 ml of diesel. A sixth sample was prepared by spraying 18.3 grams of HpG with about 2 ml of a 1:1 GS-5/surfactant mixture which then was dried and added to 23.2 ml of diesel. An ordinary plastic spray bottle was used to spray the liquid mixture onto the gelling agent. The gelling agent was agitated by dry mixing in a Waring ® blender during the spraying. The surfactant utilized was the same as in the control sample.

On the day of preparation, samples 3-6 demonstrated less bleed-out of diesel than the conventionally prepared samples. Bleed-out is indicated by the formation of a two-phase system in the bottle with the upper phase appearing as a generally transparent liquid. The amount of bleed-out on samples 3-6 was generally comparable.

The samples were inspected again two days after preparation. The flowability of the samples was evaluated by turning the bottles on their side to determine if the LGC would behave like a fluid when titled. The conventionally treated samples 1 and 2 had little flowability and samples 3 and 4, without surfactant, also demonstrated little flowability. The gelling agent in these bottles remained stuck to the bottom of the bottle and would not flow as the bottle was tilted on its side. The samples in bottles 5 and 6 which were treated with suspending agent/surfactant showed flowability.

The samples were inspected again about 24 hours later (three days after preparation) and the only samples demonstrating flowability were bottles 5 and 6. The gelling agent readily flowed in the bottle as it was tilted. The gelling agent treated in accordance with the present invention results in a superior LGC in comparison to prior art compositions.

While that which is considered to be the preferred embodiment of the invention has been described herein, it is to be understood that modifications and changes can be made in the compositions and methods of the present invention without departing from the spirit or scope of the invention as set forth in the following claims.

What is claimed is:

1. A dry solid water-soluble polymer gelling agent formulation dispersible into an oil liquid carrier, comprising a particulate aqueous gelling agent comprising at least one member selected from the group of guar gum, hydroxypropylguar, carboxymethylhydroxypropylguar, hydroxyethylcellulose and carboxymethylhydroxyethylcelluolse with a sufficient surface coating of a surfactant and suspending agent to improve the suspendability of gelling agent in a hydrocarbon carrier fluid relative to uncoated gelling agent, the v/v ratio of suspending agent to surfactant being from about 1:5 to about 5:1.

2. The suspendable gelling agent of claim 1, wherein the w/w percentage ratio of the suspending agent to gelling agent is about 0.1% to about 50%.

3. The suspendable gelling agent of claim 1, wherein the w/w percentage ratio of suspending agent to gelling agent is about 1% to about 20%.

4. The suspendable gelling agent of claim 1, wherein the w/w percentage ratio of suspending agent to gelling agent is about 4% to about 10%.

5. The suspendable gelling agent of claim 1, wherein the v/v ratio of suspending agent to surfactant is about 1:1.

6. The suspendable gelling agent of claim 1, wherein the suspending agent is an aqueous colloidal suspension of a copolymer comprising a substantially water-insoluble polymer of particles having a dry-weight average size below 10 $\mu$m and which is formed from monomers of which from about 80% to about 100% are hydrophobic, from about 0% to about 100% are polar, and from about 0% to about 20% are hydrophilic.

7. The suspendable gelling agent of claim 1 wherein the suspending agent is a polymer colloidal suspension, comprising a branched chain alkyl acrylate monomer copolymerized with a minor amount of hydrophilic monomer and the surfactant is a nonylphenol reacted with 10 moles of ethylene oxide, styrenated phenol ethoxylate, or a phosphate ester of styrenated phenol ethoxylate.

8. A method of preparing a dry particulate suspendable water-soluble polymer gelling agent, comprising coating a particulate aqueous gelling agent comprising at least one member selected from the group of guar gum, hydroxypropylguar, carboxymethylhydroxypropylguar, hydroxyethylcellulose and carboxymethylhydroxyethylcelluolse with an amount of suspending agent and a surfactant sufficient to improve the suspendability of a gelling agent in a hydrocarbon carrier fluid, the v/v ratio of suspending agent to surfactant being from about 1:5 to about 5:1.

9. The method of claim 8, further comprising drying the coated gelling agent.

10. The method of claim 8, further comprising admixing the coated gelling agent with a hydrocarbon carrier fluid to form a liquid gel concentrate.

11. The method of claim 8, wherein the suspending agent and surfactant are first mixed together and the resulting mixture is then coated on the gelling agent.

12. The method of claim 8, wherein the gelling agent is coated by spraying it with the suspending agent.

13. The method of claim 8, wherein the w/w percentage ratio of the suspending agent to gelling agent is about 0.1% to about 50%.

14. The method of claim 8, wherein the w/w percentage ratio of the suspending agent to gelling agent is about 1% to about 20%.

15. The method of claim 8, wherein the w/w/ percentage ratio of the suspending agent to gelling agent is about 4% to about 10%.

16. The method of claim 8, wherein the v/v ratio of suspending agent to surfactant is about 1:1.

17. The method of claim 8, wherein the suspending agent is an aqueous colloidal suspension of a copolymer comprising a water-insoluble polymer of particles having a dry-weight average size below 10 $\mu$m and which is formed from monomers of which from about 80% to about 100% are hydrophobic, from about 0% to about 100% are polar, and from about 0% to about 20% are hydrophilic.

* * * * *